(12) United States Patent
Cook

(10) Patent No.: US 6,271,935 B1
(45) Date of Patent: Aug. 7, 2001

(54) METHOD TO REMOVE EDGE ARTIFACTS FROM SKEWED ORIGINALS

(75) Inventor: William A. Cook, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/159,048

(22) Filed: Sep. 23, 1998

(51) Int. Cl.⁷ .............................. G06K 15/02; G06K 9/46; G06T 7/60; H04N 1/38
(52) U.S. Cl. ...................... 358/1.9; 358/1.18; 358/488; 358/453; 358/464; 382/282; 382/286; 382/289; 382/319
(58) Field of Search ...................... 382/319, 318, 382/289, 290, 275, 282, 283, 286, 199; 358/488, 463, 464, 1.9, 1.18, 453, 538

(56) References Cited

U.S. PATENT DOCUMENTS

| | | | |
|---|---|---|---|
| 4,823,395 | * | 4/1989 | Chikauchi .......................... 382/199 |
| 4,899,225 | | 2/1990 | Sasuga et al. . |
| 4,922,350 | * | 5/1990 | Rombola et al. ..................... 358/488 |
| 5,079,624 | | 1/1992 | Sasuga et al. . |
| 5,101,283 | | 3/1992 | Seki et al. . |
| 5,121,195 | | 6/1992 | Seki et al. . |
| 5,216,724 | * | 6/1993 | Suzuki et al. ......................... 382/135 |
| 5,414,529 | | 5/1995 | Terada et al. . |
| 5,436,733 | | 7/1995 | Terada et al. . |
| 5,510,908 | * | 4/1996 | Watanabe et al. .................... 358/448 |
| 5,548,663 | | 8/1996 | Sekine et al. . |
| 5,613,016 | * | 3/1997 | Saitoh .................................. 382/174 |
| 5,862,257 | | 1/1999 | Sekine et al. . |
| 5,901,253 | * | 5/1999 | Tretter .................................. 382/289 |
| 5,903,660 | * | 5/1999 | Huang et al. ........................ 382/132 |
| 5,974,199 | * | 10/1999 | Lee et al. ............................. 382/289 |
| 5,987,270 | * | 11/1999 | Hulan et al. ........................... 399/45 |
| 6,049,636 | * | 4/2000 | Yang ................................... 382/289 |

* cited by examiner

Primary Examiner—Scott Rogers
(74) Attorney, Agent, or Firm—Fay, Sharpe, Fagan, Minnich & McKee, LLP

(57) ABSTRACT

A system and method are providing for implementing the blanking of an image of a skewed original document in a full image area where the blanking region is adjusted line-by-line and pixel-by-pixel, allowing an edge at an arbitrary angle to be masked. This system and method allow for skew blanking regions surrounding an image of a skewed original document so that no data from the original document is lost, by initially reducing the image of the original document to fit in the full image area, and all background artifacts from the platen show through and dirt from the top cover of the digital copier are removed.

21 Claims, 9 Drawing Sheets

RECALL ALL DOCUMENT PARAMETERS.
RECALL ALL PLATEN PARAMETERS.
RECALL ALL LEAD EDGE PARAMETERS.
RECALL DELTA R2 - DELTA R5.

USING PIXEL-BY-PIXEL AND LINE-BY-LINE METHOD, SET ALL PIXELS TO PREDETERMINED VALUE FROM EDGE_START_PIXEL TO EDGE_END_PIXEL ON LINES FROM EDGE_START_LINE TO START_LINE.

PIXEL BY PIXEL, LINE BY LINE SET ALL PIXELS TO PREDETERMINED VALUE FROM EDGE_START_PIXEL TO START_PIXEL WHERE START_PIXEL IS INITIALIZED AT INIT_START_PIXEL AND IS MODIFIED EACH LINE TO START_PIXEL + START_DELTA.
FURTHER, START_DELTA = DELTA R2 FOR CURRENT LINE < START_LINE R4; AND START_DELTA = DELTA R4 FOR CURRENT LINE > START_LINE R4.

PIXEL BY PIXEL, LINE BY LINE SET ALL PIXELS TO PREDETERMINED VALUE FROM END_PIXEL TO EDGE_END_PIXEL WHERE END_PIXEL IS INITIALIZED AT INIT_END_PIXEL AND IS MODIFIED EACH LINE TO END_PIXEL + END_DELTA.
FURTHER, END_DELTA = DELTA R3 FOR CURRENT LINE < START_LINE R5; AND END_DELTA = DELTA R5 FOR CURRENT LINE > START_LINE R5.

PIXEL BY PIXEL, LINE BY LINE SET ALL PIXELS TO PREDETERMINED VALUE FROM EDGE_START_PIXEL TO EDGE_END_PIXEL FOR LINES END_LINE TO EDGE_END_LINE.

METHOD TO REMOVE EDGE ARTIFACTS FROM SKEWED ORIGINALS

FIELD OF THE INVENTION

This invention relates to imaging devices, such as printers and copiers, and more particularly to a system and method for removing paper edge and platen background artifacts from images to be printed of documents which were copied skewed relative to a platen in a digital copier. The invention allows a user to blank the surrounding regions of an image of the original document if it is skewed in the full image area by using a line-by-line and pixel-by-pixel replacing of each pixel value to a predetermined value along an edge of the image of the original document at any arbitrary angle.

BACKGROUND OF THE INVENTION

In the present invention, a user may place an original document onto the platen of a digital copier where the placement is at a large angle to the platen, which would normally be noticed and corrected by this user before copying the document. In contrast, the placement could be at a slight angle to the platen, which is unnoticed, or the user could be in a rush and non-observant, and this can result in a skewed image of the original document being saved in the copier memory for printing. Further, the cover of a digital copier can become dirty forming a non-white area around the image of the original document, reducing the quality of the printed document. To overcome these problems, a user will desire to blank out all of the unwanted platen and cover artifacts that would surround the image of the skewed original document without causing any of the original document's data to be lost.

Traditionally, the blanked region is orthogonal to the scanner array on all four sides of the full image area. The drawback for the traditional approach is that by using known orthogonal blanking techniques to remove the artifacts in severely skewed originals, part of the original's content may be removed and the artifacts, e.g., platen show through and copier top dirt, may not be completely eliminated. As can be clearly seen in prior art FIG. 1, the original document was scanned into the digital copier at a severely skewed angle. Using a conventional blanking technique, the original document 2 is blanked orthogonally, as is shown as 6, which clearly cutoff parts of the original document 4 and its data, and left artifacts 8, e.g., platen show through and copier top dirt, reducing the quality of the image and resulting print. The conventional way of blanking around a document is by raster scanning around a margin of the document which replaces pixels with a predetermined pixel value using a set size of the margin. Unfortunately, this usually results in the cutting off of parts of the original document containing important data and leaving of the background artifacts.

It would be advantageous if the background of the image of the original document could be completely blanked, regardless of that fact that the document was placed on the platen at a small or severely skewed angle, without any loss of data. It also would be advantageous if the blanking technique ensured that a user could completely blank the regions surrounding the document so that no data of the document was lost and all of the background artifacts, caused by the platen show through and a dirty top of a digital copier, were removed thus leaving a more accurate and more perfect image of the original document to be printed than conventional blanking techniques.

Unfortunately, known systems do not provide for blanking out regions surrounding the document where they only blank out horizontal and vertical regions on the edges of the image. In doing this, the blanking will remove desired data from the image from the original document, and will leave behind background artifacts of platen show through and copier top dirt which reduces the quality of the image to be printed.

The present invention contemplates a new skew blanking technique which achieves the above-referenced advantages, and others, and resolves appurtenant difficulties.

SUMMARY OF THE INVENTION

In the subject invention, a system and method provide a user with the ability to blank regions surrounding the image of the original document in a full image area of a digital copier. This is done so that no data from the original document is lost and all areas which may contain background artifacts, either from platen show through or dirt of the top cover of a copier, are removed. The technique allows this to be done regardless if the original was placed in a slightly skewed or severely skewed direction on the platen.

In accordance with the present invention, the user may first reduce the image size of the image of the original document in the full image area so that the entire image of the original document shows up in the full image area before the blanking initiates. In this way, although the image is skewed of the original document, a user can blank out all artifacts that are unwanted and have the entire original document show up in the printed image without losing any data from the original document.

In accordance with a primary aspect of the present invention, there is a system and method for removing artifacts from an image of a skewed original document comprising the steps of performing a pre-scan of the original document and storing certain predetermined parameters, of the original document storing parameters of the digital copier, determining if the image of the original document is skewed in a full image area, wherein if the image of the original document is skewed in the full image area, performing the further steps of, recalling the stored parameters of the original document and the digital copier, i.e., platen parameters, setting selected regions, preferably a first through sixth region, with the background artifacts in this selected region, preferably surrounding the image of the original document in the full image area, and scanning the original document, wherein the predetermined parameters of the original document before the scanning are correlated with the scanned image of the original document, and, performing a skew blanking technique to replace the pixel values in the first through sixth regions surrounding the image of the original document in the full image area with a predetermined pixel value.

In accordance with another aspect of the present invention, the first through sixth regions are defined as being from first through sixth lead-edge lines of the image of the original document, wherein the lead-edge lines are at least one of the predetermined parameters correlated to the image of the original document, to first through fourth edges of the full image area wherein the first through fourth edges are defined as being the top edge, right edge, bottom edge, and left edge, respectively, of the full image area.

In accordance with another aspect of the present invention, defining the first region as being from a horizontal top lead-edge line of the image of the original document to the first edge of the full image area. Defining the second region as being from the horizontal top lead-edge line of the image of the original document, down to where the image of the original document intersects with the fourth edge of the full image area. Defining the third region as being from the horizontal top lead-edge line of the image of the original document down to where the original document intersects with the second edge of the full image area. Defining the fourth region as being from an intersection of the image of the original document with the fourth edge of the full image area to a bottom horizontal lead-edge line of the image of the original document. Defining the fifth region as being from an intersection of the image of the original document with the second edge of the image down to the bottom horizontal lead-edge line of the image of the original document. Finally, defining the sixth region as being from the bottom horizontal lead-edge line of the image of the original document to the third edge of the full image area.

In accordance with a still further aspect of the present invention, the skewed blanking is done using a line-by-line and pixel-by-pixel blanking of the first through sixth regions. Further, only the artifacts of a platen and cover of the digital copier are blanked during the skew blanking. Finally, the image of the original document can be reduced to fit all of the image of the original document in the full image area before beginning said skew blanking.

Therefore, it would be advantageous if a system and method were provided that: (1) could determine if an original document is skewed in an image on a digital copier; (2) could determine regions surrounding said original document which are desired to be blanked; (3) could perform a line-by-line and pixel-by-pixel blanking of the regions surrounding the image of the original document, completely blanking out the background artifacts, regardless if it is at an arbitrary angle relative to the platen or not, and without losing any data; (4) can reduce the image of the original document in the full image area so that the image of the entire original document is located in the full image area, further ensuring that no data is lost; and (5) where this can all be performed in well known digital copiers and scanners.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the device and the steps of the methods, whereby the objects contemplated are termed as hereinafter more fully set forth, specifically pointed out in the claims, and illustrated in the accompanying drawings in which:

FIGS. 6A–6E are a detailed view of the flowchart of FIG. 5; and,

DETAILED DESCRIPTION OF THE INVENTION

Figure 1:
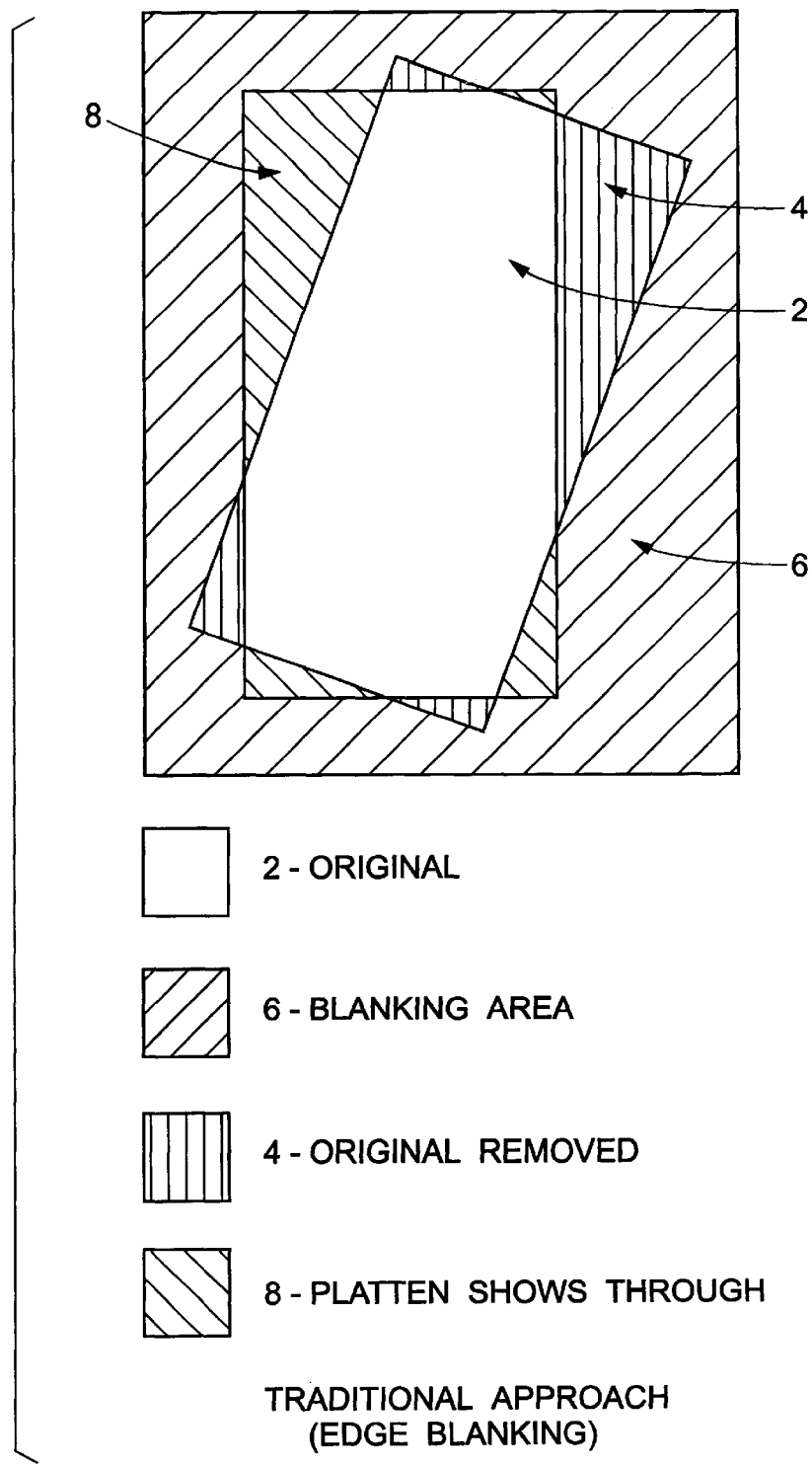
FIG. 1 is an illustration of a prior art conventional edge blanking technique.

Referring now to the drawings wherein the showings are for purposes of illustrating the preferred embodiments of the invention only, and not for purposes of limiting the same, FIGS. 2–7 illustrate the preferred implementation of the present invention.

Figure 2:
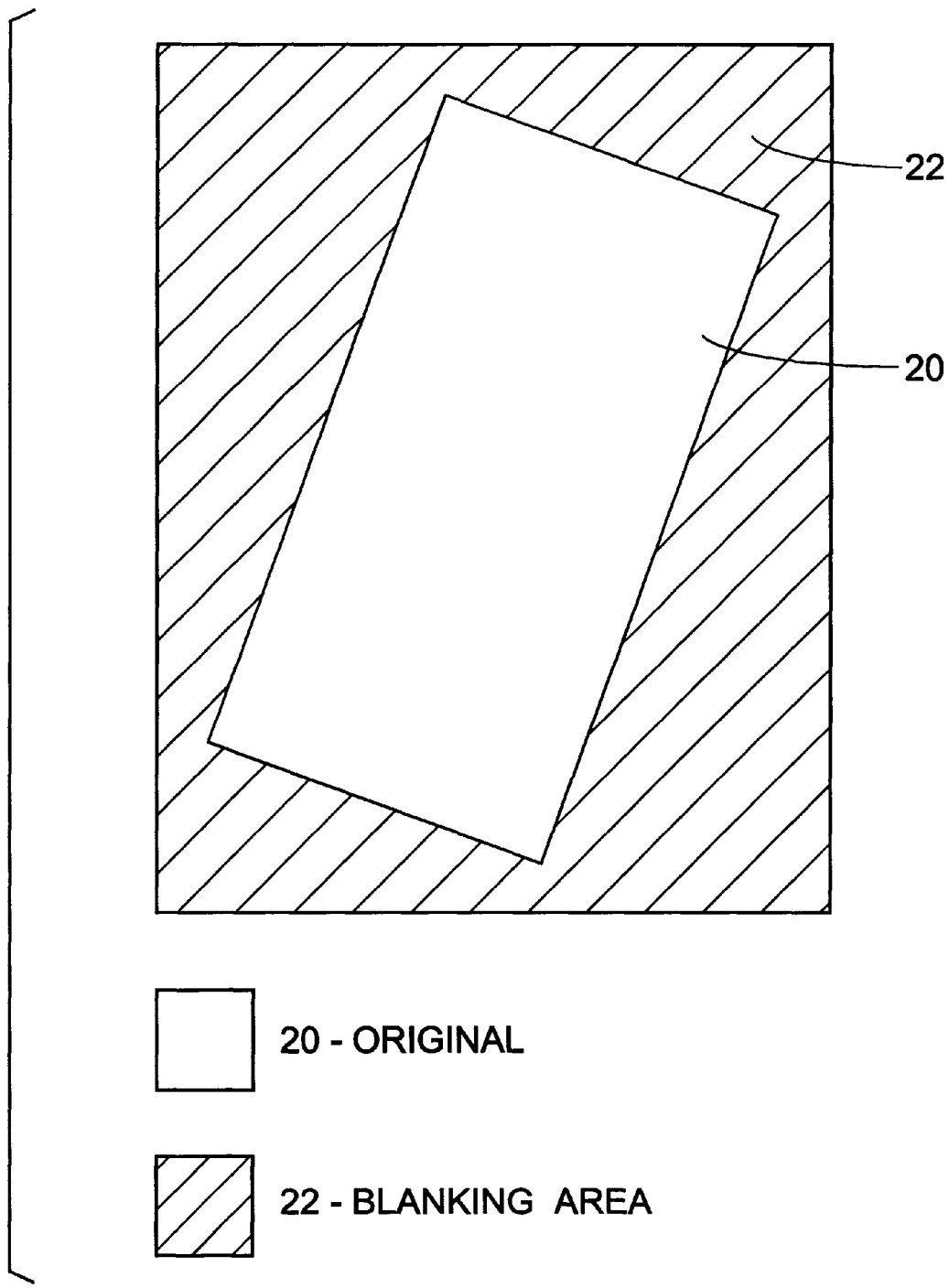
FIG. 2 is an illustration of an exemplary embodiment according to the present invention which shows the final full image area to be printed of the original document.

As shown in FIG. 2, the skew blanking technique will allow for the image of the original 20 to fully be shown on a printed image while blanking area 22 will eliminate all background artifacts caused by platen show through and a dirty top of the digital copier. As can be clearly seen in FIG. 2, the disadvantages of the conventional skew blanking technique in FIG. 1 are overcome.

Figure 3:
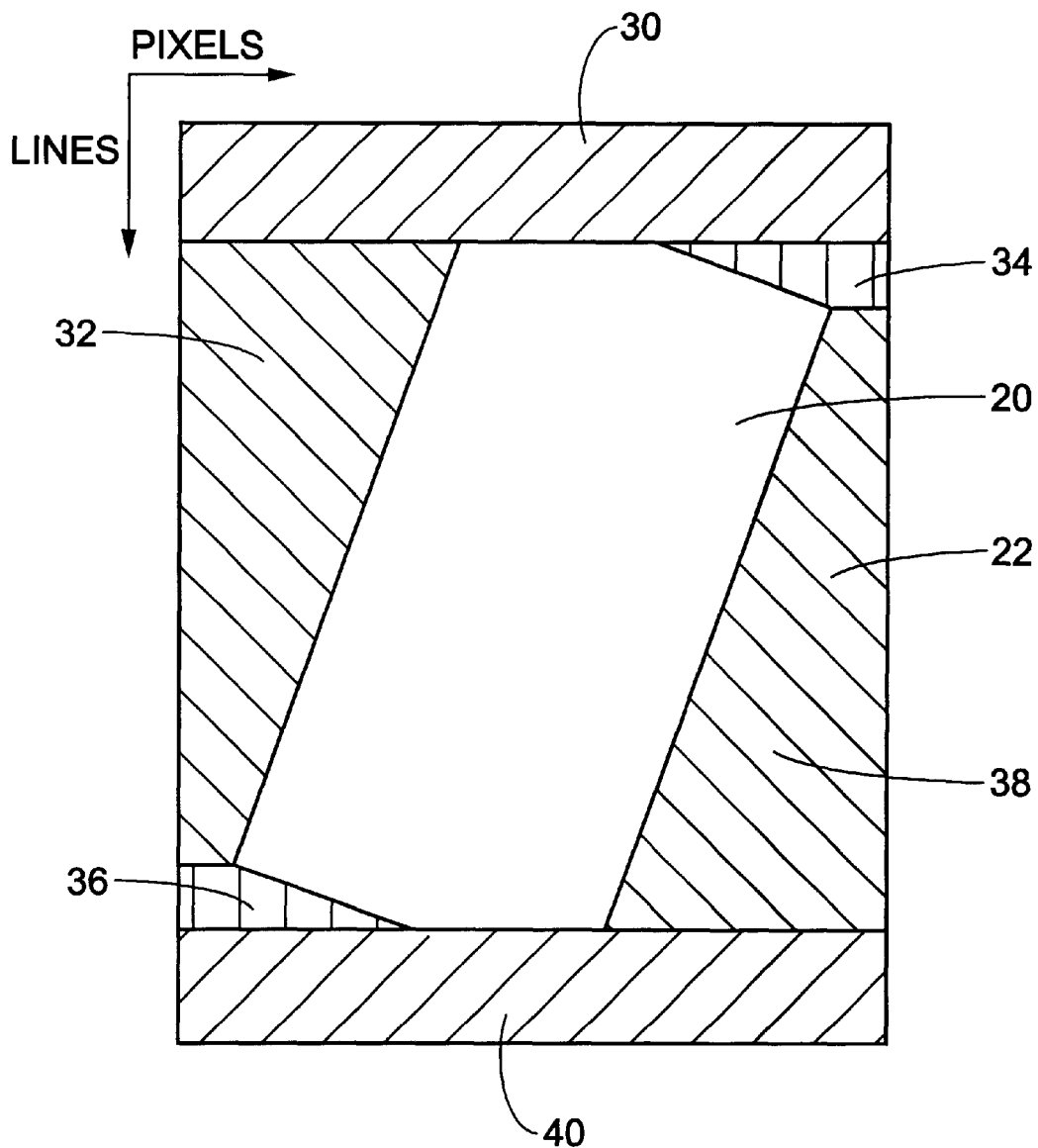
FIG. 3 is an illustration of the exemplary embodiment according to the present invention which shows the first through sixth regions surrounding the image of the original document which will be blanked.

As shown in FIG. 3, the skewed original 20 and blanking area 22 are shown after the skew blanking has been performed. Elements 30, 32, 34, 36, 38 and 40 represent regions 1, 2, 3, 4, 5, and 6, respectively, which contain the background artifacts which were completely blanked. These selected regions are defined as shown in the Figure to allow for pixel-by-pixel and line-by-line blanking to be performed on the background of the full image area to eliminate any artifacts of the platen or digital copier top. The pixel-by-pixel blanking will go in increasing pixel count from the left-most pixel to the right-most pixel in the full image area. The line-by-line blanking will start at the top edge of the full image area and proceed downward to the bottom edge of the full image area using the methods and techniques as will be described hereafter more particularly in connection with FIGS. 4–7d.

As is a well known technique in the art, a pre-scan is performed on the original document when it is placed on the platen before the actual copying takes place. During this pre-scan, values representing the size, orientation, disposition, and lead-edge of each edge of the original document will be stored into the digital copier memory. It is appreciated that the present invention may contemplate using any suitable way of scanning, storing, and recalling the size information and the location, disposition, coordinate and slope information of the lead-edges of the original document and the platen parameters of the digital copier. For example, the platen may have sensors which can determine the corners of the original document, the size of the original document, the placement or orientation of the original document, the disposition of the document, and any other parameters needed to help in the skew blanking of the area surrounding the image of the original document in the full image area.

The conventional way of doing the lead-edge detection involves, scanning across the platen to detect where the values of pixels change rapidly from a dark pixel value to a light pixel value, which should indicate the edge of the document. Historical representations of pixel values representing this edge are stored in the memory, and when this scanning detects the rapid change in pixel value, this change is compared to the historical data to ensure that this is a lead-edge of a document and not something else. This is done for each lead-edge of the original document to ensure that all the parameters required to do the skew blanking technique are stored in memory. The lead-edges are stored as coordinate location values based on counting of pixels and lines where the values begin at the top left corner of the full image area at count zero going across the image to the right to a top count pixel value and then starting from the top line of the full image area at a zero again, and ending at the bottom line the full image area. This sets the coordinates of the image of the document on the full image area, and helps the digital copier to determine the slope of the image of the original document.

Figure 4:
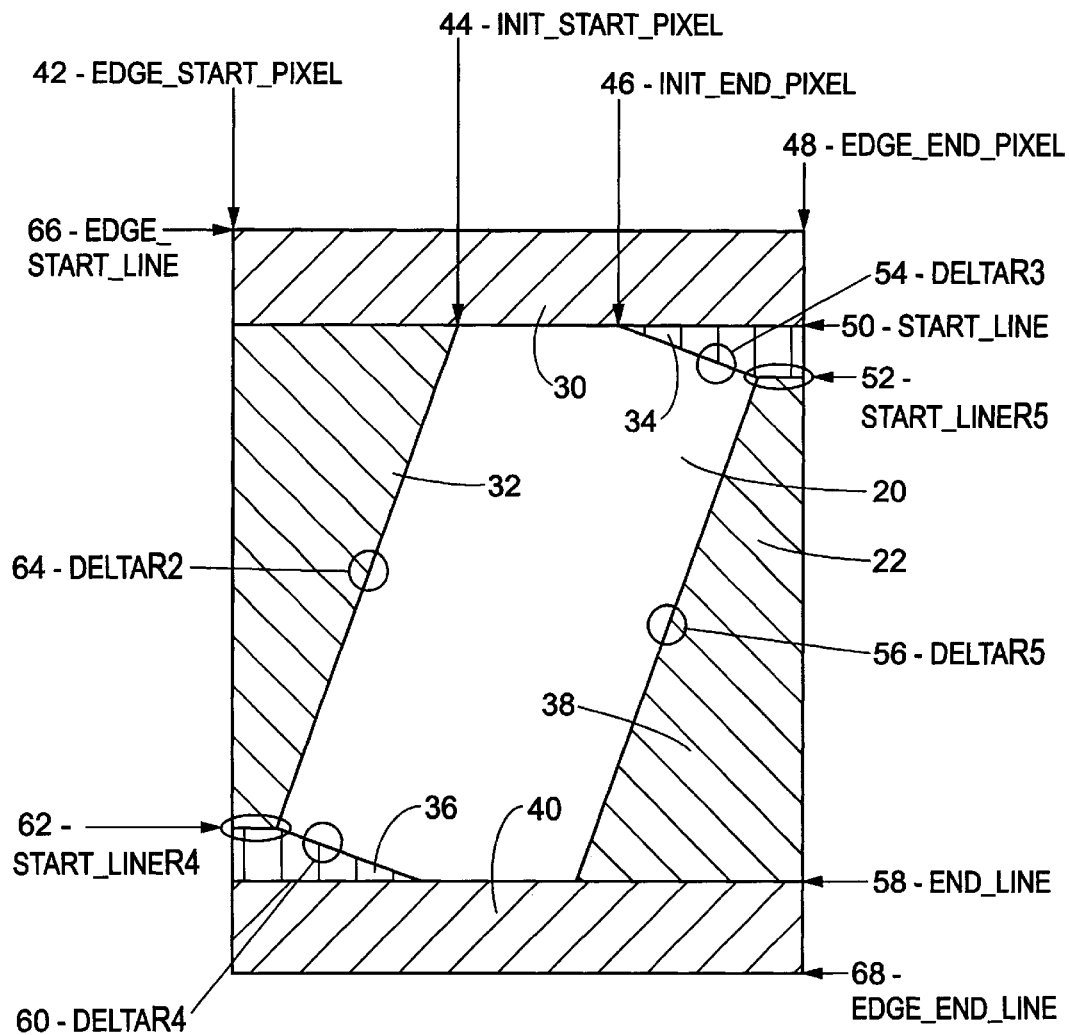
FIG. 4 is an illustration of the exemplary embodiment showing several starting and ending pixel and line locations which will be used to help control the skew blanking.

As shown in FIG. 4, a more detailed view of how the pre-scan assists the digital copier in determining the pixel coordinates of the document's location, the lead-edge lines of the document, and the slopes for the lead-edges of the document, which are at an arbitrary angle to the platen, to initialize the skew blanking process. The predetermined parameters from the pre-scan of the original document are correlated to the image of the original document during the scan of the original document.

To better understand this process, the different pixel locations will be fully described. Starting with the left top part of FIG. 4, the edge start pixel 42 is determined along with the edge start line 66, the initial start pixel 44, the initial end pixel 46, and the edge end pixel 48. After these parameters are determined, the different start lines are then stored into the memory. First, start line 50 is stored followed by start line R5 52, start line R4 62, end line 58, and edge end line 68. After these parameters are stored into memory, the slopes of the edges of the skewed document are calculated and stored as DELTAR2 64, DELTAR3 54, DELTAR4 60, and DELTAR5 56. These parameters are all required to perform the line-by-line and pixel-by-pixel skew blanking technique, where the pixel values in regions 1–6 are adjusted to a predetermined value. By adjusting the background area, regions 1–6, to this predetermined value, in essence, the system blanks each pixel, pixel-by-pixel, to a uniform value. The blanking starts and stops according to the stored pixel coordinates of the lead-edge lines, as determined by the start and end pixels, the start and end lines, and the slope of the lead-edge lines bordering the regions which are to be blanked. This technique of pre-scanning, storing, calculating, and further storing the values of locations and slopes of the different parameters needed in the skew blanking technique can be done by a variety of combinations of different computers, processors, and software that will be apparent to those of ordinary skill in the art. This information is stored in a digital copier memory by techniques known in the art, and is applied to a scan of the original document to reduce or enlarge the size of the image of the original document to ensure that it is in the full image area, and then to perform the skew blanking technique removing all artifacts e.g. from platen show through and/or a dirty cover of the digital copier.

The four slope values DELTAR2 64, DELTAR3 54, DELTAR5 56, and DELTAR4 60 are all values expressed in terms of pixels per line. These values are assigned floating point numbers. For each new line the appropriate DELTA value is added to the current start or end pixel values, which will also be maintained as floating point values. The integer portion of the result is used to determine the pixel values bordering the regions to be blanked, correlating to regions 1–6 30–40.

Figure 5:
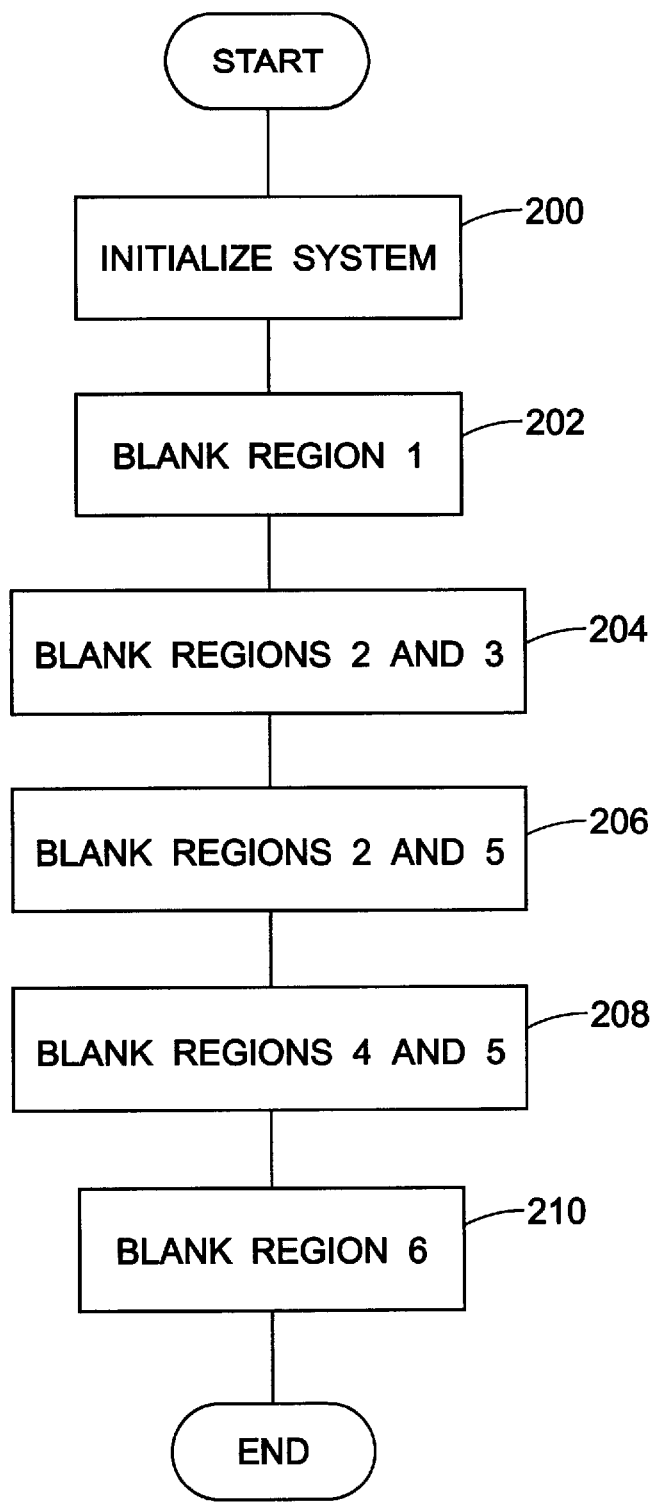
FIG. 5 is a flowchart showing the steps in which skew blanking will take place.

As shown in FIG. 5, six steps used in a particular skew blanking technique are shown in order. By way of example, the steps correspond particularly to the sample image in FIG. 4. In step 200 the system is initialized. Step 202 blanks region 1 30. Step 204 blanks region 2 32 and region 3 34. Step 206 blanks region 2 32 and region 5 38. Step 208 blanks region 4 36 and region 5 38. And step 210 blanks region 6 40. A more generalized view of each of these steps detailing the process by which each region is defined and blanked will be described hereinafter more particularly in connection with FIGS. 6A–6F.

After the pre-scan is done to store the predetermined parameters of the original document, the parameters are evaluated to determine if the full image area contains a skewed image of the original document. If this determination is positive, then the skew blanking technique of the present invention is performed using the predetermined parameters during a scan of the original document.

As is shown in FIG. 6A, process 300 corresponds to step 200 from FIG. 4. All of the platen and correlated original document image lead-edge and slope parameters are recalled to be used by the processor in the skew blanking technique, which initiates the system and process.

In FIG. 6B, process 302 corresponds to step 202 where region 1 30 is blanked. Process 302 starts with edge start pixel 42 (as best shown in FIG. 4) and a pixel-by-pixel and line-by-line blanking is done until edge end pixel 48 (i.e. the right edge of the full image area) is detected on the start line 50.

In FIG. 6C process 304 corresponds to blanking region 2 32. Moving pixel-by-pixel and line-by-line blanking is done for region 2 32 starting at the edge start pixel 42 at start line 50. Blanking continues along this line until the initial start pixel 44. The process then passes through the document and resumes on the right side as will be illustrated further below. Continuing with the left side, each successive scan line is blanked from edge start pixel 42 to start pixel 44 incremented by deltaR2 64 for each line down. When the current scan line equals start lineR4 62, blanking proceeds from edge start pixel 42 to start pixel incremented by deltaR4 60. This process continues until end line 58 is reached. As can be seen, this method will allow for the complete blanking of the regions, and will not disturb any of the image of the original document.

FIG. 6D explains an embodiment of blanking the right side. 306 is in all essential respects the mirror image of 304. One skilled in the art will recognize that the processes in 304 and 306 are performed in parallel. That is, the left side (or 304) proceeds until the image is detected, then the right side (or 306) is blanked along the same line, leaving the image intact.

In FIG. 6E process 308 completes the blanking in region 6 40 by doing the same techniques as described above for regions 1 30 starting at edge start pixel 42 and going across pixel-by-pixel and down line-by-line until edge end line 68 and edge end pixel 48 are detected. When the skew blanking is finished, using this technique, the end image, as best seen in FIG. 2, is printed.

The process as described in discussing FIGS. 5 and 6 results in the final product as best seen in FIG. 2. FIG. 2 shows a skewed image which had platen and cover artifacts and which had an image of the original document that was not completed in the full image area which was blanked using the skew blanking technique of the present invention. This skew blanking technique initiated in the copier system reduced the image of the original document size so that it fit into the full image area, then it went on to eliminate all background artifacts from both the platen show through and the dirty copier lid or top so that only a blanked single pixel value background 22 and a skewed image of the original document 20 are seen in the image to be printed. This will leave an image which overcomes the prior art (as seen in FIG. 1) problems which both cutoff parts of the document when doing its blanking technique and, further, did not fully blank all background artifacts. In this present invention, you are left with an image of the original document in the full image area to be printed which is cleaner and clearer than the prior art.

Figure 7A:
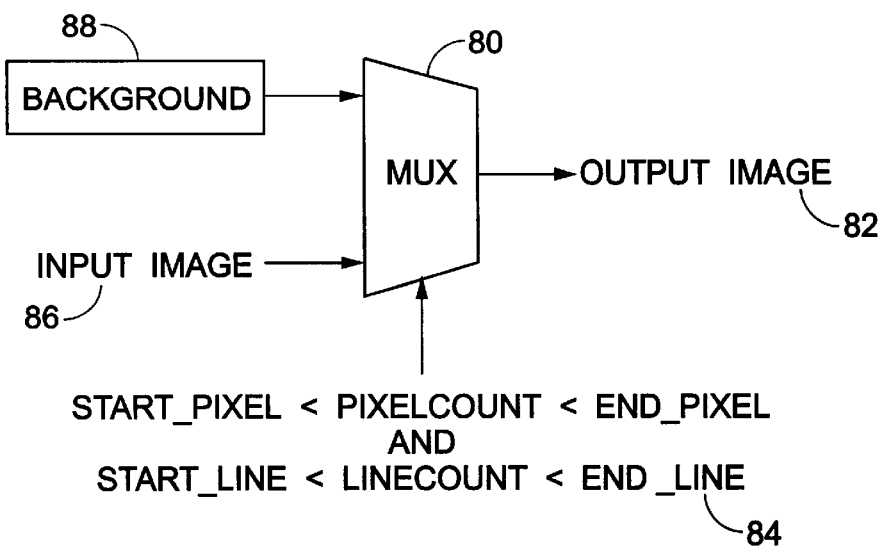
FIGS. 7A–7D are the control system used for the exemplary embodiment.
Figure 7B:
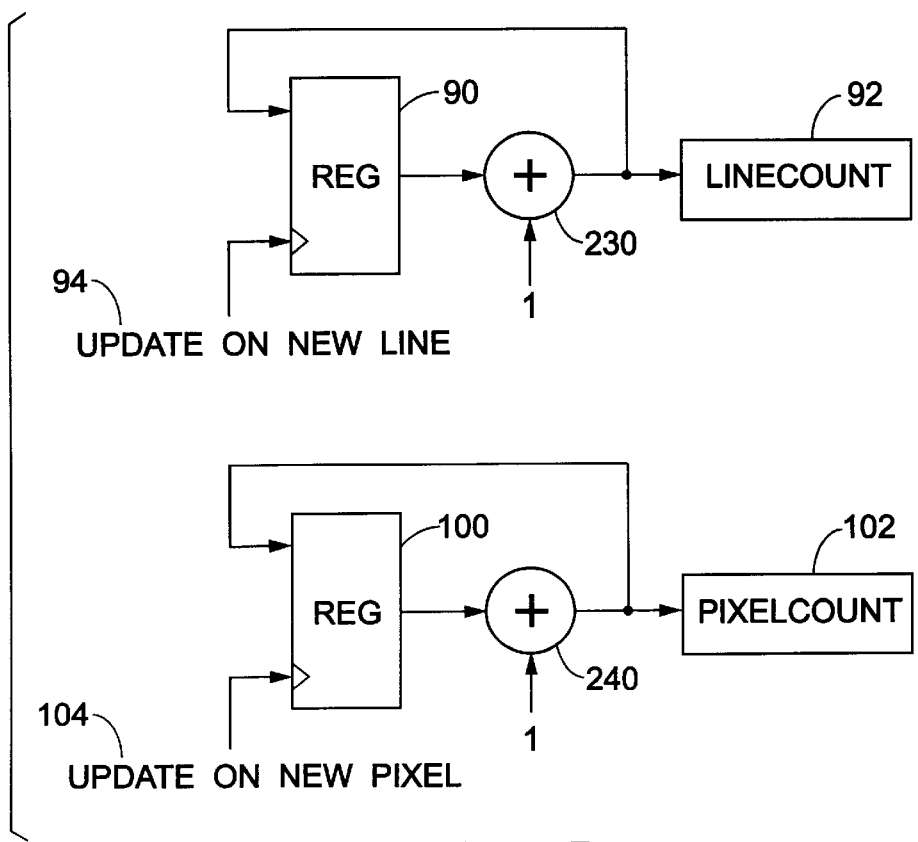

Turning now to FIGS. 7A–7B, there are shown several control systems that perform the algorithms, processes, and methods used in the present invention for the pixel-by-pixel and line-by-line determination of the beginning and ending value coordinates of the pixels. Using these control systems, the present invention ensures that the document's dimensions are used to eliminate any blanking of the document data and that the artifacts in the background surrounding the image of the original document are blanked. FIGS. 7A–7D show the control systems that perform the processes, 300–308, as described in FIG. 6.

Turning to FIG. 7A, there is shown a logical operator that determines if input image is to pass through to output or if the predetermined background (i.e. blanking) is to be output. In the preferred embodiment, a comparator control system uses a multiplexer 80 having inputs of the predetermined background data 88, the input image data 86, and a control algorithm 84 for the start and end pixels and start and end lines for the different regions 30–40. In FIG. 7A, control element 84 has two parts:

START_PIXEL<=PIXELCOUNT<END_PIXEL is true when not in regions 2–5 (restated, the above is true when within the lateral edges of the image). The other condition:

START_LINE<LINECOUNT<END_LINE is true when not in regions 1 or 6 (restated, the above is true when within the top and bottom edges of the image). Thus, when both of these conditions are true, the input image passes through to be output. On the other hand, when either of these conditions are false, the predetermined background (blanking) is output.

Turning to FIG. 7B, there is shown a line counter 92 and a pixel counter 102. These counters determine the current line and pixel number within a document. At the end of each line or pixel, a trigger 94, 104 triggers the registers 90, 100 to output the previous value into the adders 230, 240 thereby incrementing PIXELCOUNT or LINECOUNT by 1.

Figure 7C:
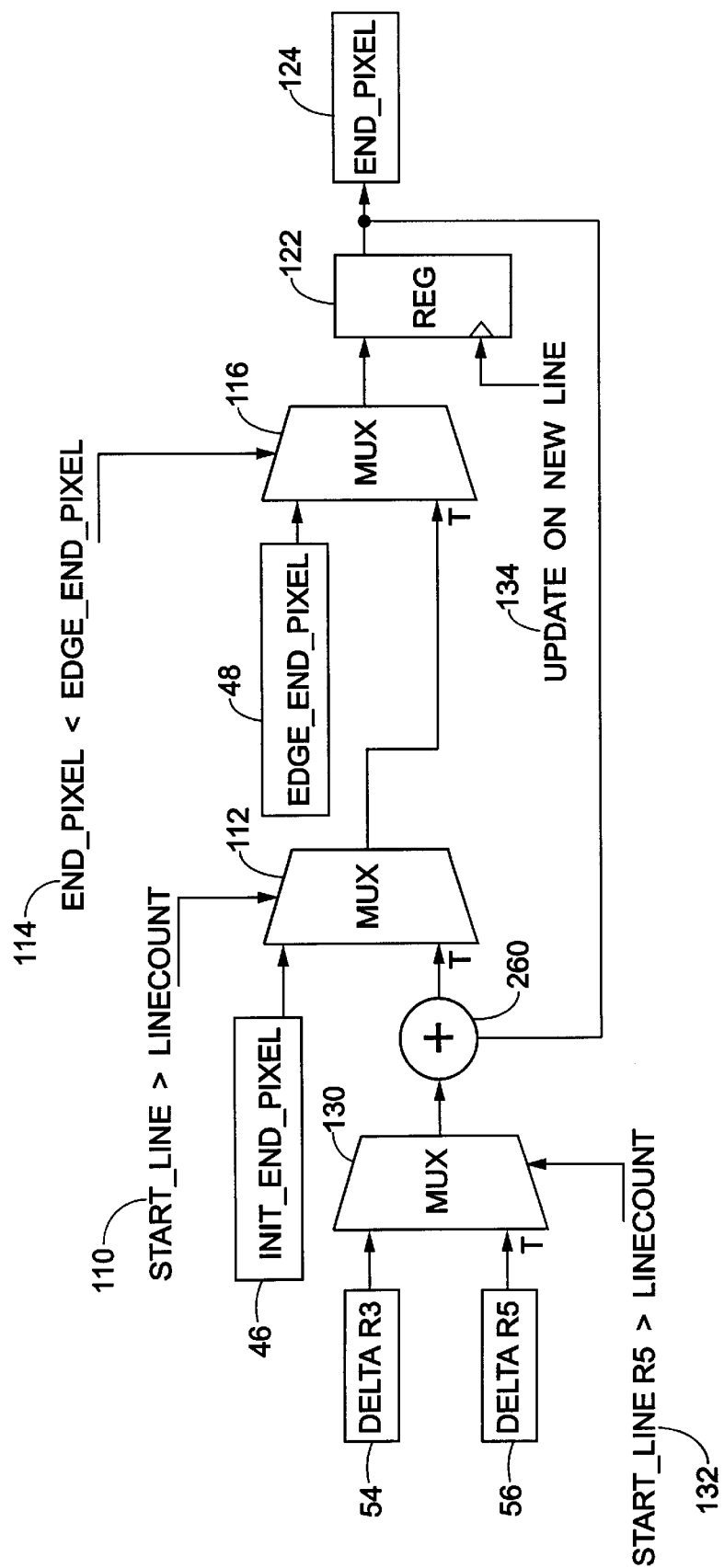

Turning to FIG. 7C, we see a suitable embodiment of a control system to compute the value of end pixel 124. Recall from FIG. 6D that end_pixel=end_pixel+end_delta. In the embodiment of FIG. 7C multiplexer 130 has as inputs DELTAR3 54, and DELTAR5 56 (the end_delta values). Logical operator 132 determines which of the inputs 54, 56 are to output from the multiplexer 130 (deltaR3 54 if above Start_LineR5, deltaR5 56 if below). Thus, if the LINECOUNT<START_LINER5 52, DELTAR3 54 is provided. On the other hand, if LINECOUNT>START_LINER5 52, DELTAR5 56 is output. Regardless of which value is output, it is sent to adder 260, which also receives as feedback the previous end pixel value 124. The output of adder 260 proceeds to another multiplexer 112 that has INIT_END_PIXEL 46 as an additional input. Logical operator 110 bases the output on whether START_LINE 50>LINECOUNT. This result will be true when processing regions 2–6 resulting in the added sum to pass through to define END_PIXEL. However, when processing region 1 and INIT_END_PIXEL will be an END_PIXEL candidate for the follow-on multiplexer 116, along with EDGE_END_PIXEL 48. This output is determined by the logical operator 114, namely, whether END_PIXEL is less than EDGE_END_PIXEL 48 which it typically will be. In this case the END_PIXEL added value is output. However, in a special case, the two operands will be equivalent, and EDGE_END_PIXEL will then be output from multiplexer 116 into register 122. Register 122 holds the value until a trigger 134 is received, outputting END_PIXEL 124 and continuing the process.

Figure 7D:
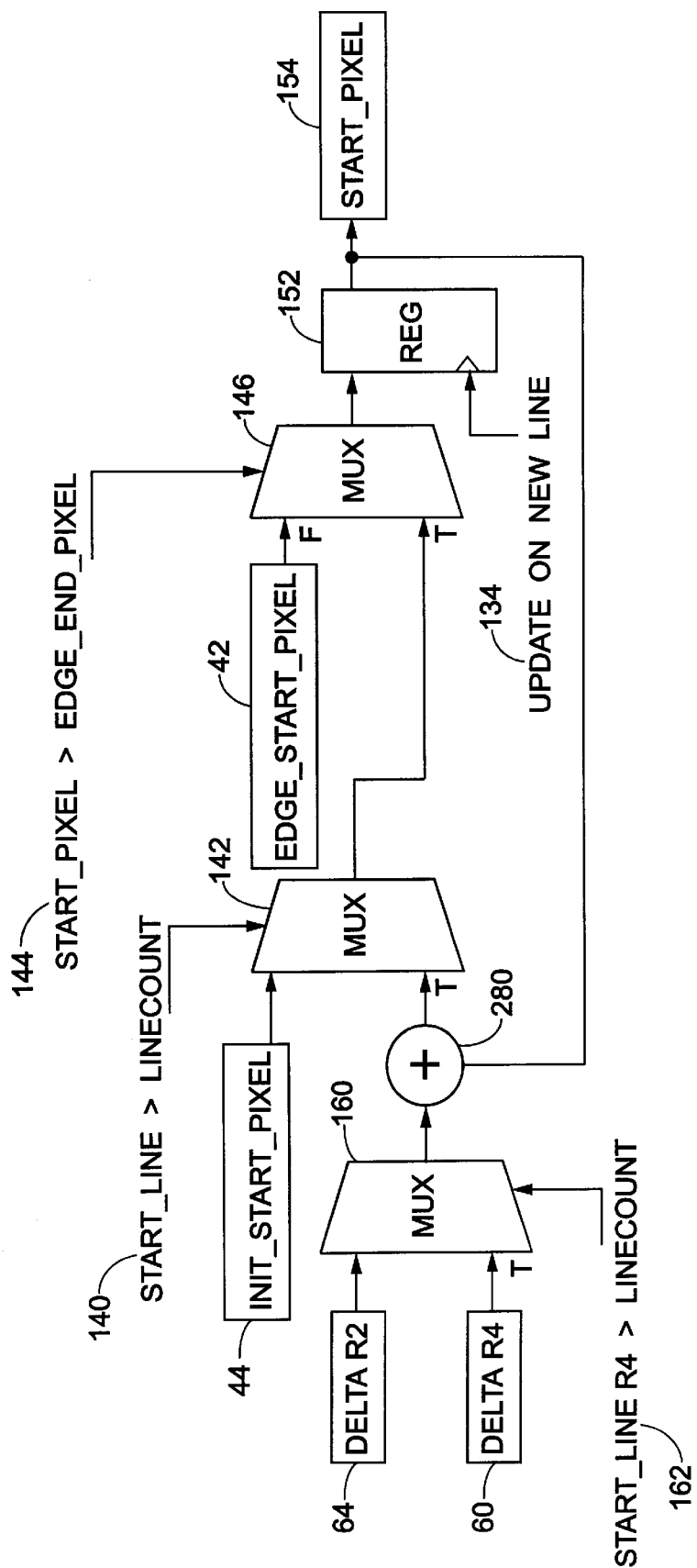

FIG. 7D is similar to FIG. 7C in its function and system. This circuit suitably provides the system with a current value for START_PIXEL 154. Recall from FIG. 6C that start_pixel=start_pixel+start_delta. In the embodiment of FIG. 7D multiplexer 160 has as inputs DELTAR2 64, and DELTAR4 60 (the start_delta values). Logical operator 162 determines which of the inputs 64, 60 are to output from the multiplexer 160 (deltaR2 64 if above Start_LineR4, deltaR4 60 if below). Thus, if the LINECOUNT<START_LINER4 62, DELTAR2 64 is provided. On the other hand, if LINECOUNT>START_LINER4 62, DELTAR4 60 is output. Regardless of which value is output, it is sent to adder 280, which also receives as feedback the previous start pixel value 154. The output of adder 280 proceeds to another multiplexer 142 that has INIT_START_PIXEL 44 as an additional input. Logical operator 140 bases the output on whether LINECOUNT<START_LINE 50. When processing in region 1 LINECOUNT will be less than or equal to START_LINE 50, thus the multiplexer is FALSE and INIT_START_PIXEL 44 passes through the multiplexer 142. On the next line when LINECOUNT is greater than START_LINE 50 then the summed value from adder 280 proceeds. In other words, start_pixel equals the INIT_START_PIXEL. When processing region 1 the output of multiplexer 142 is then used as an input for the follow-on multiplexer 146, along with EDGE_START_PIXEL 42. This output is determined by the logical operator 144, namely, whether START_PIXEL is greater than EDGE_START_PIXEL 42. In most cases this result will be TRUE, and the added value will pass through multiplexer 146. However, when START_PIXEL equals EDGE_START_PIXEL (for example, at START_LINER4) multiplexer 146 outputs the EDGE_START_PIXEL 42 value. Register 152 holds the value until a trigger 134 is received, outputting START_PIXEL 154 and continuing the process.

The above description merely provides a disclosure of the particular embodiments of the invention. It is not intended for the purposes of limiting the same thereto. As such, the invention is not limited to only the above described embodiments. Rather, it is recognized that one skilled in the art could conceive alternative embodiments that fall within the scope of the invention.

What is claimed is:

1. In a digital copier having predetermined platen parameters, a method for removing background artifacts from a full image area comprising:
   pre-scanning the full image area for predetermined values representing a disposition of an original document, and storing the predetermined values in a digital copier memory;
   scanning the full image area;
   identifying selected regions in the full image area during said scanning based on said predetermined values; and
   performing a blanking technique during said scanning to replace pixel values in said selected regions.

2. The method according to claim 1, further comprising:
   determining if an image of the original document is skewed in the full image area from the pre-scan predetermined values, wherein if the image is skewed, performing the further step of:
   recalling the pre-scan predetermined values of said original document, and correlating the predetermined values with the image of the original document from the scanning step for setting the selected regions as regions surrounding the skewed image of the original document in the full image area containing the background artifacts based on the platen parameters and the predetermined values of the original document, and wherein the blanking is skew blanking.

3. The method according to claim 2, further comprising:
defining the selected regions from the predetermined values correlated with the image of the original document, wherein at least one of the predetermined values is lead-edge lines of the original document, and wherein the selected regions are from the lead edge-lines to a first through fourth edge of the full image area.

4. The method according to claim 3, further comprising:
defining the selected regions to be at least a first through sixth region; and
defining the first through fourth edges of the full image area as being a top edge, a right edge, a bottom edge, and a left edge, respectively, of the full image area.

5. The method according to claim 4, further comprising:
defining the first region as being from a horizontal top lead-edge line of the image of the original document to the first edge of the full image area.

6. The method according to claim 4, further comprising:
defining the second region as being bounded by a horizontal top lead-edge line of the image of the original document, the left edge of the full image area, a horizontal image corner start line, and a left side lead-edge line.

7. The method according to claim 4, further comprising:
defining the third region as being bounded by a horizontal top lead-edge line of the image of the original document, the right edge of the full image area, a horizontal image corner start line, and a skewed top side lead-edge line.

8. The method according to claim 6, further comprising:
defining the fourth region as being bounded by the left edge of the full image area, a bottom horizontal lead-edge line of the image of the original document, a skewed bottom side lead-edge line, and the horizontal image corner start line.

9. The method according to claim 7, further comprising:
defining the fifth region as being bounded by the right edge of the full image area, the horizontal bottom lead-edge line of the image of the original document, the right side lead-edge line, and the horizontal image corner start line.

10. The method according to claim 4, further comprising:
defining the sixth region as being from the horizontal bottom lead-edge line of the image of the original document to the bottom edge of the full image area.

11. The method according to claim 2, further comprising:
using a line-by-line and pixel-by-pixel blanking of the selected regions during the skew blanking.

12. The method according to claim 2, further comprising:
defining the background artifacts as platen show though and/or dirt from a cover of the digital copier, wherein the background artifacts are completely blanked during the skew blanking.

13. The method according to claim 2 further comprising:
reducing the image of the original document in the full image area before beginning said blanking, wherein all of the image of the original document is located in the full image area.

14. A xerographic imaging apparatus which blanks selected regions in a full image area, the apparatus comprising:
means for pre-scanning the full image area for predetermined values representing a disposition of an original document and storing the predetermined values in a memory;
means for scanning the full image area;
means for identifying the selected regions of the full image area during said scanning based on said predetermined values; and
means for performing a blanking technique during said scanning which replaces pixel values in said selected regions with a predetermined pixel value.

15. The apparatus according to claim 14, further comprising:
means for determining if said scanned image including the original document is skewed in the full image area from the pre-scan predetermined values, wherein if the image is skewed, the apparatus further comprises:
means for recalling the pre-scan predetermined values of said original document, wherein the predetermined values of the original document from the pre-scan are correlated with the scanned image including the original document from the scanning step and the selected regions surround the skewed image of the original document in the full image area; and,
wherein the means for performing a blanking technique is a means for skew blanking.

16. The apparatus according to claim 14, further comprising:
means for defining the selected regions from the predetermined values correlated to the scanned image including the original document, wherein at least one of the predetermined values is lead-edge lines of the original document, and wherein the selected regions include a lead edge-line and one of a first through fourth edge of the full image area.

17. The apparatus according to claim 16, further comprising:
means for defining the selected regions to be at least a first through sixth region; and
means for defining the first through fourth edge of the full image area as being a top edge, a right edge, a bottom edge, and a left edge, respectively, of the full image area.

18. The apparatus according to claim 17, wherein:
the first region includes a horizontal top lead-edge line of the image of the original document and the first edge of the full image area;
the second region includes the horizontal top lead-edge line of the image of the original document, the left edge of the full image area, a horizontal left image corner start line, and a left side lead-edge line;
the third region includes the horizontal top lead-edge line of the image of the original document, the right edge of the full image area, a horizontal right image corner line, and a skewed top side lead-edge line;
the fourth region includes the left edge of the full image area, a bottom horizontal lead-edge line of the image of the original document, a skewed bottom side lead-edge line, and the horizontal left image corner start line;
the fifth region includes the right edge of the full image area, the horizontal bottom lead-edge line of the image of the original document, the right side lead-edge line, and the horizontal right corner start line; and, the sixth region includes the horizontal bottom lead-edge line of the image of the original document and the bottom edge of the full image area.

19. The apparatus according to claim 14, wherein the selected regions include platen show though and/or dirt from a cover of the apparatus, the means for performing a blanking technique including:

a pixel-by-pixel substitution in the selected regions of determined pixel values for image values.

20. The apparatus according to claim 14 further comprising:

means for reducing the scanned image including the original document before beginning said blanking, wherein the reduced scanned image including the original document is located in the full image area.

21. A method for blanking regions of an imaging area comprising:

storing parameters representative of a disposition of an original document in the imaging area of a xerographic imaging device;

based on the parameters, determining if the original document is skewed in the imaging area;

scanning the imaging area including the original document;

correlating the stored parameters during scanning with scanned imaging area including the original document;

defining selected regions during scanning surrounding the image of the original document in the full image area; and, blanking pixels during said scanning pixel-by-pixel and line-by-line in the selected regions.

\* \* \* \* \*